United States Patent [19]

Spadotto et al.

[11] 4,429,906

[45] Feb. 7, 1984

[54] FEMALE ELEMENT FOR QUICK-COUPLING CONNECTION FOR FLEXIBLE PIPES

[75] Inventors: Oliviano Spadotto, Pordenone; Gianfranco Roman, Pasiano; Claudio Da Rold, Pordenone, all of Italy

[73] Assignee: Claber S.p.A., Fiume Veneto, Italy

[21] Appl. No.: 285,324

[22] Filed: Jul. 22, 1981

[30] Foreign Application Priority Data

Jul. 31, 1980 [IT] Italy .............................. 23847 A/80

[51] Int. Cl.³ ............................................ F16L 37/08
[52] U.S. Cl. .................................... 285/315; 285/423
[58] Field of Search ....................... 285/315, 316, 423

[56] References Cited

U.S. PATENT DOCUMENTS

| 3,847,393 | 11/1974 | Busselmeier | 285/315 |
| 4,216,982 | 8/1980 | Chow | 285/315 |
| 4,219,222 | 8/1980 | Brusadin | 285/315 X |

FOREIGN PATENT DOCUMENTS

| 2138103 | 2/1973 | Fed. Rep. of Germany . |
| 2237024 | 7/1974 | Fed. Rep. of Germany . |
| 1342189 | 12/1973 | United Kingdom . |

Primary Examiner—Dave W. Arola
Attorney, Agent, or Firm—Cushman, Darby & Cushman

[57] ABSTRACT

The female element includes male-element locking teeth and locking-teeth thrusting means formed as single body of a resiliently flexible material, with which there cooperates a retaining ring which is able to cause movement of the teeth to a releasing position.

2 Claims, 5 Drawing Figures

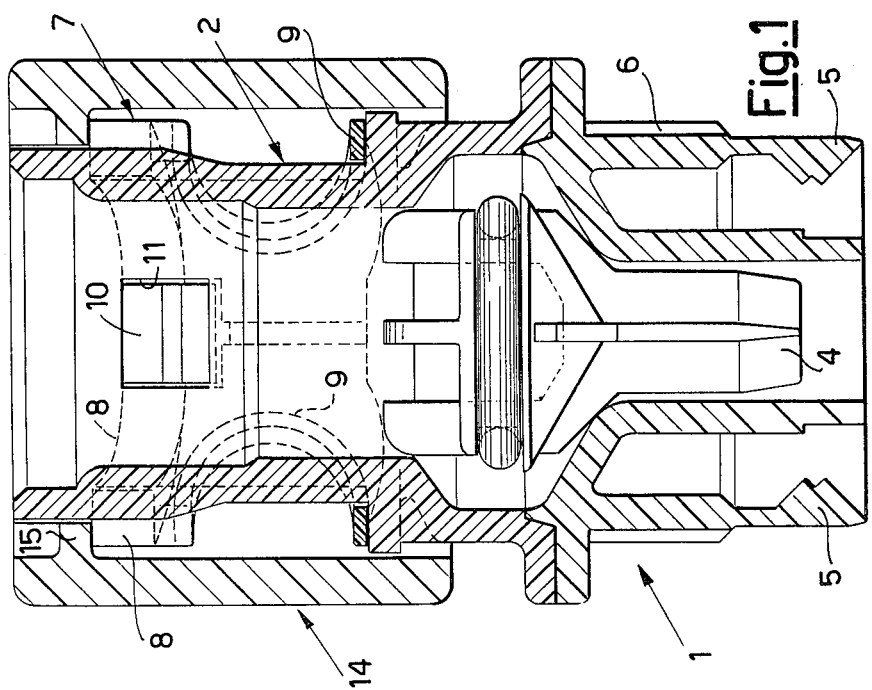
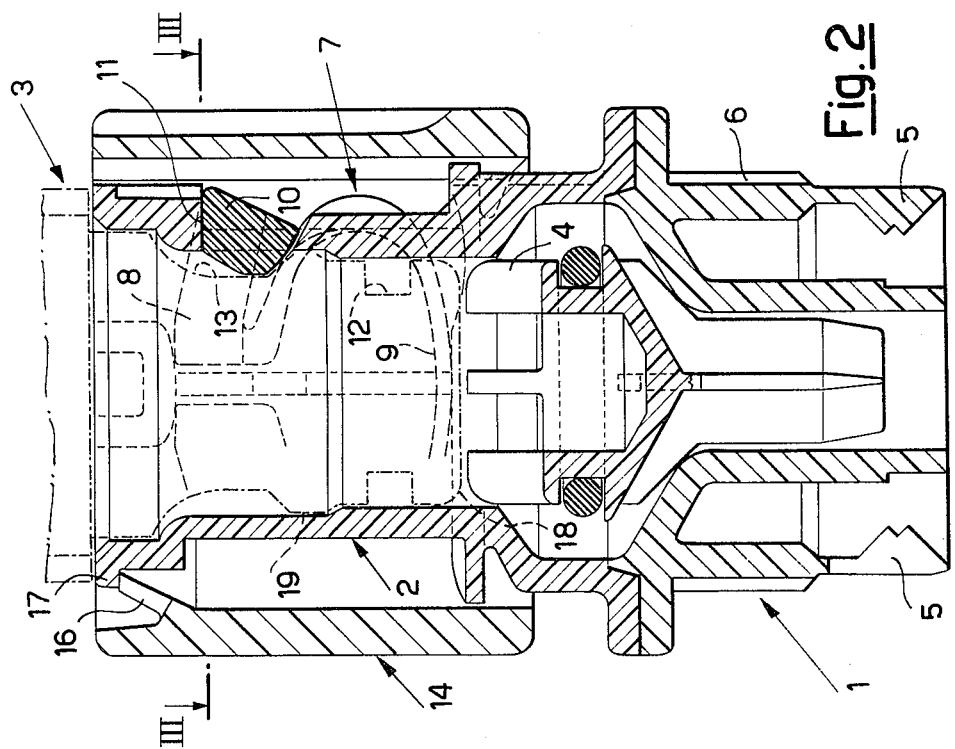

FEMALE ELEMENT FOR QUICK-COUPLING CONNECTION FOR FLEXIBLE PIPES

The present invention relates to a female element for quick-coupling connection for flexible pipes.

The conventional technique for elements of this kind is that the basic tubular body intended to receive the male element of the connection has associated thereto three pieces destined to cooperate with each other in order to realize a releasable coupling between the two male and female elements. A first piece substantially consists of a pair of teeth which pass through lateral diametrally opposed windows of the tubular body of the female element, a second piece consists of a retaining ring which retains said teeth radially and is axially slidingly mounted on said tubular body, and the third piece consists of a helical spring which is in turn mounted on said tubular body with the purpose of resiliently holding said ring in a rest position in which the same ring forces said teeth to protrude within said tubular body in suitable position for locking engagement with a male element possibly introduced into the female element.

Such a conventional technique has the drawback of requiring rather long and difficult assembling operations, which cause too high production costs. Moreover, it should be noted that not only during the extraction of the male element but also during the insertion thereof it is necessary to move the retaining ring manually from the rest position in order to allow the teeth to go out of the internal space of the tubular body of the female element; this is an operational complication which is rather bothersome for the user.

According to some more recent solutions, the manufacturers have tried to combine variously the functions of the three conventional pieces in order to reduce the number of the pieces and consequently to facilitate, at least in the expectations, the assembling operations. The attempts made up to now, however, have not produced satisfactory results, since the assembling operations have remained finally rather complicated and a high increase of cost has sometimes been noticed. This is the case of a connection element of recent production, in which the retaining ring directly includes the locking teeth and further performs the functions of thrusting means; to this end, the retaining ring must be made with a special material with good resilient properties (in particular, acetalic resin) and is therefore very expensive.

The object of the present invention is to realize a female element for quick-coupling connection for flexible pipes, which is of low cost and easy assembling and obviously capable of perfect operation, particularly allowing the insertion and the locking of the male element without any necessity of handling previously the retaining ring.

According to the invention this object has been reached by means of a female element for pipe connection, comprising a stiff tubular body able to receive the male element of the pipe connection, at least two lateral diametrally opposed windows obtained in said tubular body for the passage of respective teeth for locking said male element, resilient means acting on said teeth from the outside of said tubular body for yieldingly urging the same teeth to protrude within said tubular body in suitable position for the engagement with said male element, and a retaining ring slidingly mounted on said tubular body and manually operable to force said teeth to move to a backward position against the thrust of said resilient means, characterized in that said teeth and said resilient means are formed in a single body of resilient flexible material, which surrounds said tubular body and includes thickened portions, which can be engaged by said retaining ring in order to force said teeth to said backward position.

The connection element according to the invention appears very convenient as regards both the assembling simplicity and the cost. Since the connection element includes a single body which performs the functions of the locking teeth and the resilient thrusting means and is arranged in such a way as to surround the tubular body of the connection element, it appears in fact of very easy assembling, because only one piece is to be assembled in addition to the retaining ring and because said piece remains autonomously in position once it has been mounted and awaiting the mounting of the retaining ring. Since the latter is a separate piece exempt from functions which require material and shape of exceptional type, it is apparent, on the other hand, that the retaining ring may be constructed in conventional manner, i.e. with very simple shape and low cost material, and thus may maintain itself at a very much limited level of cost. The whole connection element may be relatively unexpensive, in particular, even considering the higher cost of the single body including the teeth and the resilient means (which body is to be made of acetalic resin or the like), it may be cheaper than the known connection element which combines only in the retaining ring all the functions which are conventionally performed by the three pieces consisting of teeth, spring and ring. It should finally be noted that, by giving said single body suitable shape and capacity of resilient deformation, it become possible to insert the male element of the pipe connection into the female element without any necessity of handling the retaining ring, which is therefore used only for the release.

The features of the present invention will be made more evident by the following detailed description of a possible embodiment thereof, which is illustrated by way of example in the accompanying drawings, in which:

FIG. 1 shows a connection element according to the invention in longitudinal section along the line I—I of FIG. 3;

FIG. 2 shows said connection element in longitudinal section along the line II—II of FIG. 3;

Figure 3:
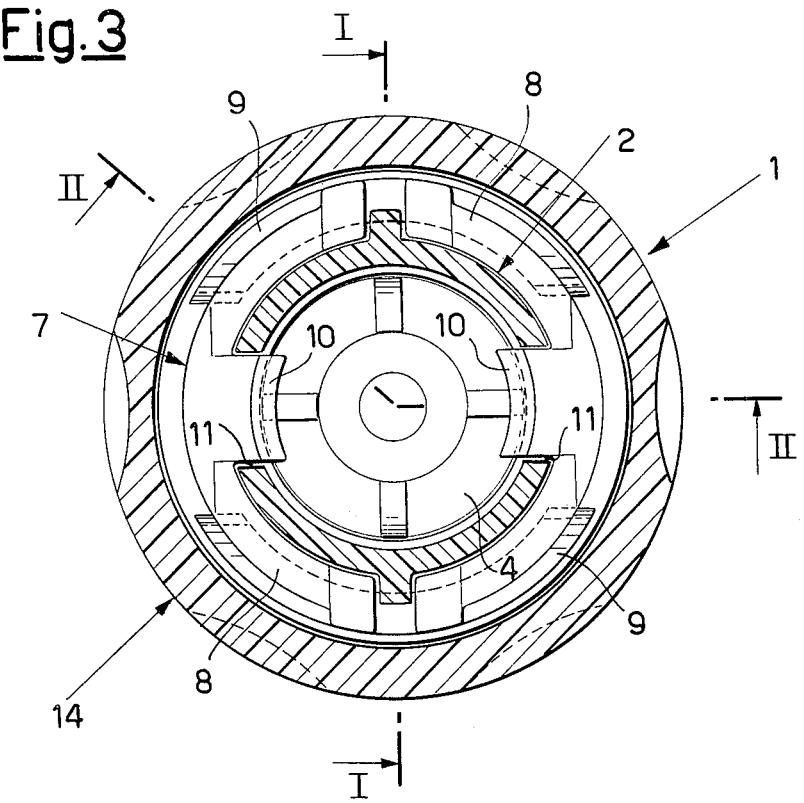
FIG. 3 shows said connection element in trasversal section along the line III—III of FIG. 2.
Figure 5:
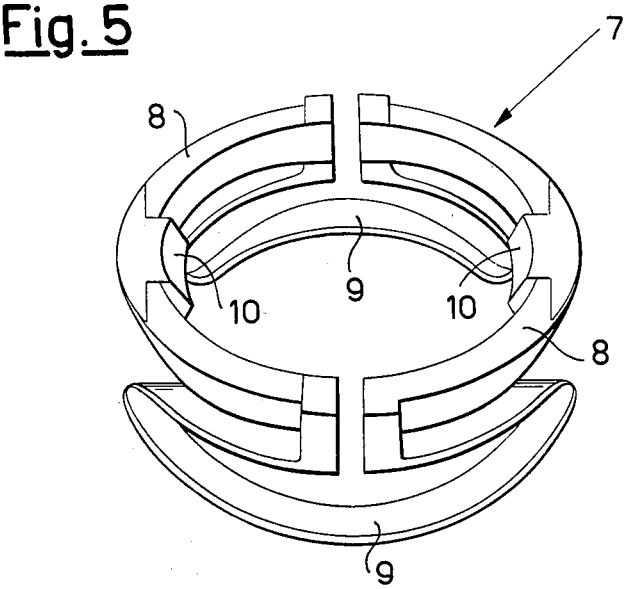
FIG. 5 shows in perspective view the single body which, in said connection element, performs the double function of locking teeth and resilient thrust means.

With reference to the drawings, there is illustrated a female element 1 for quick-coupling connection for flexible pipes. Said female element comprises a tubular body 2 of stiff plastic material, which has an open end (the upper end in FIGS. 1, 2 and 4) for receiving the male element 3 of the connection (illustrated in dash-dot lines in FIGS. 2 and 4) and the other end hydraulically controlled by a non-return valve 4 and provided with a circular succession of circumferentially spaced longitudinal reeds 5, on which a flexible pipe can be mounted and locked by means of a suitable locking nut which can be screwed on a threaded portion 6 of the tubular body 2.

Figure 4:
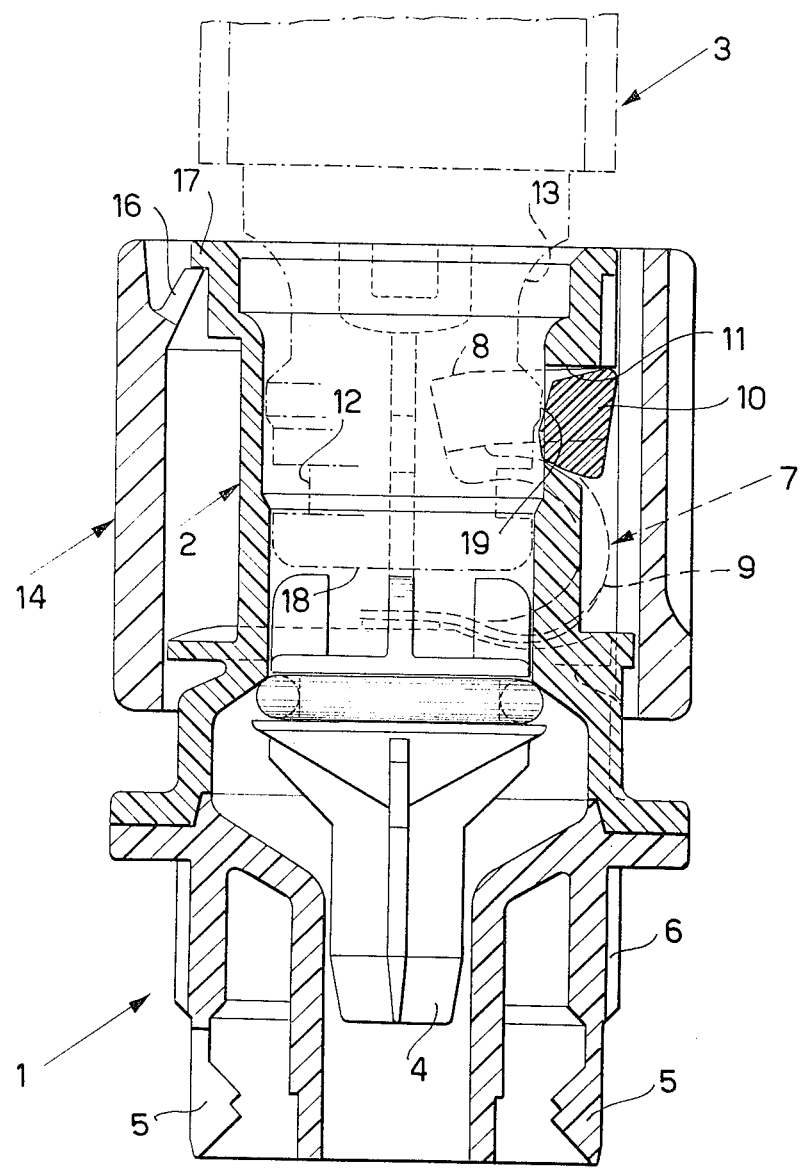
FIG. 4 shows said connection element in longitudinal section as in FIG. 2, during the insertion of the male element of the connection.

On the receiving part (the upper part as seen in FIGS. 1, 2 and 4) of the tubular body 2 there is mounted a single body 7 of resiliently flexible plastic material (preferably acetalic resin), which is substantially formed by two semicircular thickened semi-circular connector portions 8 having their ends connected to each other by two circular thinned resilient C-shaped spring portions 9 having performed bending with convexity looking at the corresponding convexity of the other thinned portion. That is, each spring portion lies in a generally semi-circular plane so as to exhibit a convex surface, and the convex surfaces of the spring portions face toward each other.

The described preordered configuration of the single body 7, particularly of the two resiliently flexible thinned portions 9 thereof, allows the same single body to remain resiliently grasped around the tubular body 2 without any necessity of additional holding members, once the single body has been mounted on the stiff tubular body 2 by taking advantage of the separation existing between the two thinned portions 9 and between the two thickened portions 8.

With the resiliently flexible single body 7 so grasped around the stiff tubular body 2, two slanting teeth 10 located at the center of the thickened portions 8 are resiliently urged to protrude, through respective diametrally opposed windows 11, inside the tubular body 2 in suitable position for the engagement with corresponding parallel circumferential grooves 12 and 13 of the male element 3 for locking the later in coupling position (FIG. 2).

Around the receiving part of the stiff tubular body 2 and the resiliently flexible body 7 there is finally arranged in axially sliding manner a retaining ring 14, which includes a pair of inner projections 15 abutting on the semicircular thickened portions 8 of the flexible body 7. The latter thus urges the retaining ring 14 towards a rest position, which is illustrated in FIGS. 1 and 2 and is defined by the abutment of further inner projections 16 of the ring on corresponding outer projections 17 of the tubular body 2. With the ring 14 in said rest position, the flexible body 7 also is at rest and its teeth 10 freely protrude inside the tubular body 2 (FIG. 2).

In order to insert the male element 3 into the female element 1 it is sufficient to push axially the male element without moving the ring 14. By so doing, firstly the end 18 of the male element 3 and then an annular projection 19, intermediate between the grooves 12 and 13, of the same male element meet with the teeth 10 of the flexible body 7, thereby causing, as a result of the separation of the two thickened portions 8, firstly the radial movement of said teeth away from one another up to the abutment on the inner wall of the ring 14 and then, as a result of the slanting shape of the teeth 10, the rotation of the same about the points of abutment on the ring 14 (FIG. 4). Both the end 18 and the annular projection 19 of the male element are thus allows to overcome the restriction created by the two teeth 10, which finally snap in unidirectional holding engagement into the annular groove 13 of the same male element (FIG. 2). The latter thus remains locked in coupled position.

For the release of the male element it is necessary to move the ring 14 axially (downwards, looking at FIGS. 1, 2 and 4) against the resilient reaction of the flexible body 7, particularly of the thinned portions 9 thereof. With such a movement the inner projections 15 of the ring 14 move downwards the thickened portions 8 of the flexible body 7, causing again a radial movement of the teeth 10 away from one another and a rotation thereof, in the same way as described for the coupling operation. The teeth 10 thus clear the entire inner cross-section of the tubular body 2 and the male element 3 can easily be extracted.

We claim:

1. A female coupling for a quick-coupling connection comprising: a stiff tubular body having a bore adapted to receive a male element having a recess thereon, said tubular body and having two windows therein at diametrically opposite locations; a retaining ring concentric with and surrounding said tubular body and means retaining said ring on said body, said ring being axially movable relative to said body; and, positioned in a space between said tubular body and said retaining ring, a single-piece connection element for selectively locking a male element in the bore of said tubular body and releasing the male element from said bore, said connection element including first and second semi-circular connector portions each having two opposite ends each of which is adjacent an end of the other semi-circular portion, said semi-circular portions facing each other and together surrounding said tubular body so as to be coaxial with the axis of said tubular body, each connector portion including intermediate its ends at least one tooth which projects radially inward into a corresponding window in said tubular body for engagement with and disengagement from a recess in the male element of the connection, said connection element further including two resilient spring portions disposed axially adjacent said semi-circular connector portions for yieldably urging said teeth to protrude inside said tubular body, each said resilient spring portion being generally C-shaped and having opposite ends one of which is integral with one end of said first connector portion and the other of which is integral with the adjacent end of said second connector portion, each spring portion lying in a generally semi-circular plane so as to exhibit a convex surface and having an axis transverse to the axis of the two connector portions, said convex surfaces of the two spring portions facing toward each other, said tubular body having stop surfaces engaging said spring portions and limiting axial movement thereof and said retaining ring having surfaces engageable with said connector portions to press said connector portions toward said spring portions upon manual axial movement of said retainer ring whereby said teeth are moved radially outward against the bias of said spring portions.

2. A female element according to claim 1 wherein said teeth have a slanting shape so as to allow the insertion of the male element of the connection without any displacement of the ring and to realize, once the insertion has been carried out, an unidirectional engagement with the same male element.

* * * * *